US011208993B2

(12) United States Patent
Yim

(10) Patent No.: US 11,208,993 B2
(45) Date of Patent: Dec. 28, 2021

(54) ENERGY-SAVING PUMP AND CONTROL SYSTEM FOR THE PUMP

(76) Inventor: Joo-Hyuk Yim, Daejeon (KR)

(*) Notice: Subject to any disclaimer, the term of this patent is extended or adjusted under 35 U.S.C. 154(b) by 82 days.

(21) Appl. No.: 14/237,900

(22) PCT Filed: Aug. 8, 2012

(86) PCT No.: PCT/KR2012/006324
§ 371 (c)(1),
(2), (4) Date: Feb. 10, 2014

(87) PCT Pub. No.: WO2013/022276
PCT Pub. Date: Feb. 14, 2013

(65) Prior Publication Data

US 2014/0199184 A1 Jul. 17, 2014

(30) Foreign Application Priority Data

Aug. 8, 2011 (KR) ........................ 10-2011-0078771
Aug. 13, 2011 (KR) ........................ 10-2011-0080932
Apr. 30, 2012 (KR) ........................ 10-2012-0045063

(51) Int. Cl.
*F04B 49/00* (2006.01)
*F04B 19/24* (2006.01)
*F04B 49/06* (2006.01)

(52) U.S. Cl.
CPC .............. *F04B 49/00* (2013.01); *F04B 19/24* (2013.01); *F04B 49/065* (2013.01); *Y02E 20/14* (2013.01); *Y02P 80/15* (2015.11)

(58) Field of Classification Search
CPC ........ F04F 1/04; F04F 1/00; F04F 1/02; F04F 1/06; F04F 1/18; F22D 5/28; F22D 5/30; F22D 5/36; F22D 11/00; F22D 11/06; F04B 19/20; F04B 19/24; F04B 23/00; F04B 23/02; F04B 23/025; F04B 49/00; F04B 39/0011; F04B 49/02; F04B 49/022; F04B 49/03; F04B 49/06; F04B 49/065; F04B 49/22
USPC ............... 417/118, 137, 138, 126, 105, 106; 91/4 R
See application file for complete search history.

(56) References Cited

U.S. PATENT DOCUMENTS 3,362,132 A * 1/1968 Schellenberg ....... B01D 19/001 137/14
3,377,994 A * 4/1968 Horne .................. F22D 11/006 122/382
4,177,767 A * 12/1979 Regamey ............... F01K 9/023 122/1 R (Continued)

FOREIGN PATENT DOCUMENTS

JP S58-108300 U 7/1983
JP 06-241007 8/1994

(Continued)

*Primary Examiner* — Charles G Freay
*Assistant Examiner* — Chirag Jariwala
(74) *Attorney, Agent, or Firm* — Maschoff Brennan

(57) ABSTRACT

An energy-saving pump, and control system for the pump comprises: a pump body arranged to receive steam from a steam generator; a steam transferor for opening/closing a pipeline between the pump body and the steam generator; and a suction valve for opening/closing a pipeline between the pump body and a water source, wherein the steam transferor is closed to receive steam and then the suction valve is opened to suction water from the water source.

11 Claims, 4 Drawing Sheets

200
600
Steam generator
300
Water source
Pump main body
100
400
Use location
110
Water level sensor
Temperature sensor
Pressure sensor
Temperature sensor
210
900
910
Steam energy determining module
Pump internal determining module
Valve opening adjustment module
Atmospheric pressure forming module
Small amount pump driving module
Thermostatic module
920
Steam transfer means
200
Suction means
300
Water supply means
400
Atmospheric pressure forming means
500
Steam chamber
600
Small amount pump
700
Thermostatic means
800

(56) References Cited

U.S. PATENT DOCUMENTS

| | | | | |
|---|---|---|---|---|
| 4,211,188 | A * | 7/1980 | Chen | F22D 11/06 122/451 R |
| 4,227,489 | A * | 10/1980 | Regamey | F01K 9/023 122/451 R |
| 4,309,148 | A * | 1/1982 | O'Hare | F03G 6/06 417/18 |
| 5,865,086 | A * | 2/1999 | Petichakis | B63H 11/02 60/325 |
| 6,042,342 | A * | 3/2000 | Orian | F04F 1/04 417/118 |
| 6,196,163 | B1 * | 3/2001 | Shah | F22D 11/06 122/40 |
| 2004/0159437 | A1 * | 8/2004 | Choi | E21B 43/01 166/335 |
| 2014/0157813 | A1 * | 6/2014 | Kato | F22B 35/00 62/310 |

FOREIGN PATENT DOCUMENTS

| | | |
|---|---|---|
| KR | 20-1992-0000504 | 1/1992 |
| KR | 10-0315342 | 11/2001 |
| KR | 10-0370176 | 1/2003 |
| KR | 10-0746517 | 8/2007 |
| KR | 10-2009-0045899 | 5/2009 |
| KR | 10-1017982 | 2/2011 |
| KR | 10-2011-0026596 | 3/2011 |
| WO | WO 2013/022276 | 2/2013 |

* cited by examiner

ENERGY-SAVING PUMP AND CONTROL SYSTEM FOR THE PUMP

CROSS-REFERENCE TO RELATED APPLICATION

This application is a National Phase of PCT Patent Application No. PCT/KR2012/006324 having International filing date of Aug. 8, 2012 which claims the benefit of priority of Korean Patent Application Nos. 10-2011-0078771, filed on Aug. 8, 2011, 10-2011-0080932, filed on Aug. 13, 2011 and 10-2012-0045063, filed on Apr. 30, 2012. The contents of the above applications are all incorporated by reference as if fully set forth herein in their entirety.

TECHNICAL FIELD

The present invention relates to an energy saving pump and a control system thereof that include a pump main body installed to receive steam in a steam generator, a steam transfer means that opens and closes a pipe between the pump main body and the steam generator, and a water supply means that opens and closes a pipe between the pump main body and a use location and that open the steam transfer means and the water supply means to supply water to the use location.

BACKGROUND ART

In general, a pump receives mechanical energy from a motor, transfers the received energy to a handling liquid, thereby transmitting the liquid from a low pressure portion to a high pressure portion. Most conventional pumps have a structure that puts a pump main body into a liquid so as to pump the liquid and that drives a piston or an impeller using mechanical energy of a motor.

A steam generation apparatus is a mechanical apparatus that generates steam by heating or boiling water and is widely used in our daily life such as power generation, industry, heating, food processing, agriculture and industry, and other fields.

However, in most steam generation apparatuses, as a water supply pump of a high pressure, at least two pumps including a reserved pump are mounted. Further, in a power plant, even if a water supply pump of a high pressure is provided, by a cavitation phenomenon due to a high temperature, pumping of a high pressure pump is not appropriately performed.

DETAILED DESCRIPTION OF INVENTION

Technical Problem

The present invention has been made in view of the above problems, and provides an energy saving pump and a control system thereof that can supply water to a use location and that can suck water from a random water source by using steam energy of a steam generation apparatus.

Technical Solution

In accordance with an aspect of the present invention, there is an energy saving pump including: a pump main body installed to receive steam from a steam generator; a steam transfer means that opens and closes a pipe between the pump main body and the steam generator; and a water supply means that opens and closes a pipe between the pump main body and a use location, wherein water is supplied to the use location by opening the steam transfer means and the water supply means.

The energy saving pump may further include a suction means that opens and closes a pipe between the pump main body and a water source, wherein after steam is received by opening and closing the steam transfer means, by opening the suction means, water of a water source may be sucked.

Advantageous Effects

According to an energy saving pump and a control system of the pump of the present invention, by using steam energy of a high pressure generating in a steam generator, water of a pump main body can be supplied to a use location or can be automatically sucked and supplied from a random water source to the pump main body without separate addition energy or with only minimum energy.

BEST MODES FOR CARRYING OUT THE INVENTION

Figure 1:
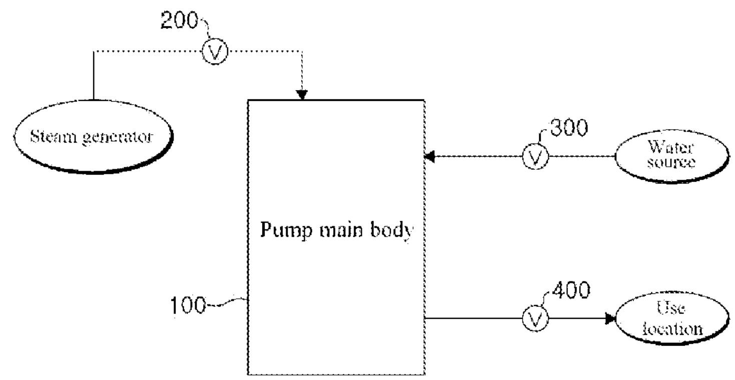
FIG. 1 is a diagram illustrating a major configuration of an energy saving pump according to a first exemplary embodiment of the present invention.

FIG. 1 is a diagram illustrating a major configuration of an energy saving pump according to a first exemplary embodiment of the present invention. The energy saving pump according to a first exemplary embodiment of the present invention includes a pump main body 100, a steam transfer means 200, a suction means 300, and a water supply means 400. Here, a steam generator is a means that generates steam by boiling water using various energy sources such as thermal power generation or nuclear power generation, and a water source includes an entire water source that can provide water such as various water supply tank equipments or a river. Further, a use location is a random use location, and a steam generator may be used as a use location.

The pump main body 100 has a structure of a sealed container or tank and has a predetermined water level of water at the inside or maintains an empty state and is designed to operate a pump according to each situation. Further, the pump main body 100 is designed to have a pressure-resistant function so as to receive steam energy of a high pressure from the steam generator. As an example, entire surfaces of the pump main body 100 are formed to have a round shape without an angle and are designed to have, for example, a cylindrical shape or a spherical shape.

The pump main body 100 is connected to the steam generator by a steam transfer cable, and a suction cable is installed in a water source direction, and a water supply cable is installed in a water supply use location direction.

The steam transfer means 200 is an opening and closing means for transferring steam of the steam generator to the pump main body 100, and as an example, an electric motion valve may be used, and another means having the same function may be employed. The suction means 300 is an opening and closing means for sucking and supplying water of the water source to the pump main body and may use an electric motion valve, a check valve, or a parallel structure of the two valves as an example, and may employ other means that perform the same function. The water supply means 400 is an opening and closing means for supplying water from the pump main body to a use location and may use an electric motion valve, a check valve, or a parallel structure of the two valves as an example, and may employ other means that perform the same function.

When describing an operation process of FIG. 1, in order to perform water supply to a use location, when the steam transfer means 200 is turned on, steam energy of a high pressure is transferred to the pump main body 100 and thus water supply is performed to the use location.

If the water supply means 400 is a check valve, water is automatically supplied, and if the water supply means 400 is an electric motion valve, driving is controlled according to a condition and water is supplied. That is, the steam transfer means 200 is turned on and driving may be controlled to supply water after determining a state of the pump main body 100.

Thereafter, when suction water supply is performed from a water source to the pump main body 100, if a condensed level of internal steam of the pump main body 100 is in a vacuum state or in a state similar to vacuum, the suction means 300 is turned on and suction water supply is performed from a random water source to the inside of the pump main body 100.

Figure 2:
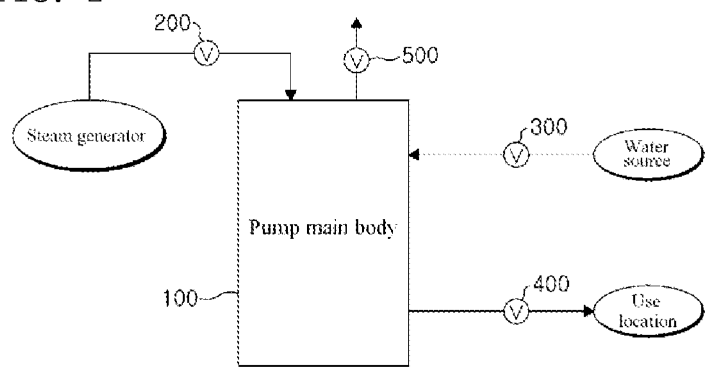
FIG. 2 is a diagram illustrating a major configuration of an energy saving pump according to a second exemplary embodiment of the present invention.

FIG. 2 is a diagram illustrating a major configuration of an energy saving pump according to a second exemplary embodiment of the present invention. An atmospheric pressure forming means 500 performs a function of discharging an internal gas of the pump main body 100 and is an opening and closing means that performs a function of forming the inside of the main body in an atmospheric pressure or adjusting a vacuum level. According to a design condition, a separate pipe is provided in the pump main body 100 and the atmospheric pressure forming means 500 may be installed in the pipe or may be installed in the pipe connected to the water source. Further, the atmospheric pressure forming means 500 may be formed to function as a means that may be manually or automatically driven. As an example, an electric motion valve may be used and other means that perform the same function may be selected.

When the atmospheric pressure forming means 500 is used, if a water source is positioned higher than that of the pump main body 100, the water source is opened and closed according to a condition. That is, suction water supply may be performed regardless of a mutual position between the water source and the pump main body 100, but if the water source is positioned higher than the pump main body 100, by opening the atmospheric pressure forming means 500, an internal pressure of the main body is formed in an atmospheric pressure, and when opening again the suction means 300, water is supplied to the inside of the main body due to a position energy difference.

Thereafter, when it is necessary to adjust a vacuum level of the inside of the pump main body 100, the atmospheric pressure forming means 500 is open and closed according to a condition. That is, when vacuum of the inside of the main body 100 is excessively formed, in order to stably drive the pump, by temporarily opening and closing (ON/OFF) the atmospheric pressure forming means 500, a vacuum level may be adjusted. For example, at the inside of the main body 100, when vacuum is excessively formed, by partially solving a vacuum state by temporarily opening and closing the atmospheric pressure forming means 500, a suction speed or a water supply level from the water source is adjusted.

Figure 3:
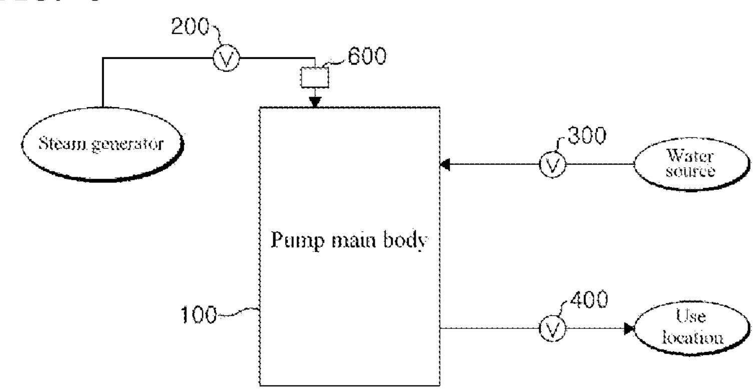
FIG. 3 is a diagram illustrating a major configuration of an energy saving pump according to a third exemplary embodiment of the present invention.

FIG. 3 is a diagram illustrating a major configuration of an energy saving pump according to a third exemplary embodiment of the present invention. A steam chamber 600 is a constituent element that smoothly enables water supply to a use location, has a diameter larger than that of a pipe, and has predetermined space. For example, the steam chamber 600 may be connected or inserted to the pipe using an expanding pipe or may be connected to the pipe at predetermined space. The steam chamber 600 may be installed in any pipe in which the steam generator and the pump main body 100 are connected according to a design condition, but may be preferably installed adjacent to a pipe inlet connected to the pump main body 100. Further, by enclosing the steam chamber 600 with a heating means according to a condition, a pressure of secured steam is not lowered.

The steam chamber 600 can more smoothly perform water supply when performing water supply to a use location using steam energy of a high pressure generating in the steam generator. That is, when steam energy is transferred to the inside of the pump main body 100, if a contact area with water included at the inside is secured in a predetermined level, the steam chamber 600 is smoothly driven, and in a some case, the inside of the pump main body 100 may be in a full level.

Therefore, while steam is secured in a predetermined level in the steam chamber 600, when steam is provided to the inside of the main body, even if a contact area is small, steam of a high density is provided and thus water supply may be smoothly performed.

Figure 4:
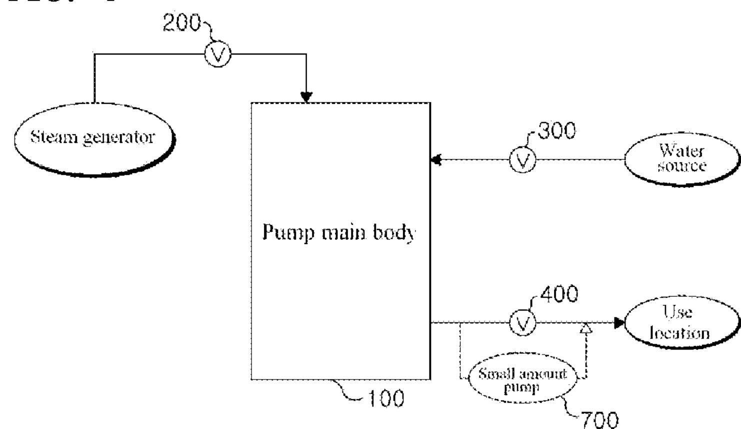
FIG. 4 is a diagram illustrating a major configuration of an energy saving pump according to a fourth exemplary embodiment of the present invention.

FIG. 4 is a diagram illustrating a major configuration of an energy saving pump according to a fourth exemplary embodiment of the present invention. A small amount pump 700 is formed to smoothly supply water from the pump main body 100 to the use location and is connected in parallel to the water supply means 400 or is formed to replace with the water supply means 400 according to a design condition. When the small amount pump 700 is connected in parallel to the water supply means 400, the water supply means 400 may be a check valve and/or an electric motion valve.

When describing a case of using the small amount pump 700, if a pressure of steam energy generated in the steam generator is not enough, a function of smoothly supplying water of the pump main body 100 to the use location is performed. That is, because a pressure of steam energy is used, even if a small amount pump is used, water is smoothly supplied to the use location.

Thereafter, when a water level of an internal tank of the steam generator is higher than that of the inside of the main body 100, water supply to the use location may not be smoothly performed according to a condition, and in this case, the small amount pump 700 is driven to use. Further, in an emergency situation such as when immediate water supply is necessary or when a pressure of steam energy generated in the steam generator cannot be used, the small amount pump 700 may be used as a reserve pump.

Figure 5:
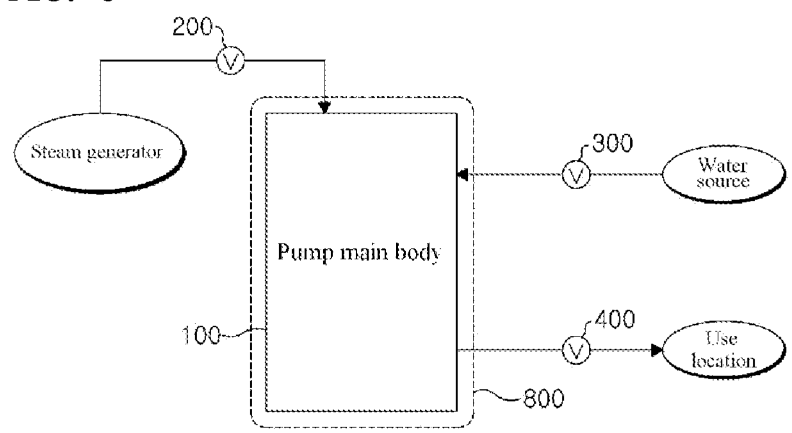
FIG. 5 is a diagram illustrating a major configuration of an energy saving pump according to a fifth exemplary embodiment of the present invention.

FIG. 5 is a diagram illustrating a major configuration of an energy saving pump according to a fifth exemplary embodiment of the present invention. A thermostatic means 800 is a means for maintaining the pump main body 100 in a constant temperature state and the inside of the pump main body 100 is a means for controlling to stably drive regardless of a peripheral environment. Preferably, the thermostatic means 800 includes a cooling means and a heating means and may include a means that can inject a refrigerant according to a design condition.

If the thermostatic means 800 is formed to have a cooling function, the thermostatic means 800 may perform a function of promoting or adjusting a condensation operation (liquefaction) within the pump main body 100.

Figure 6:
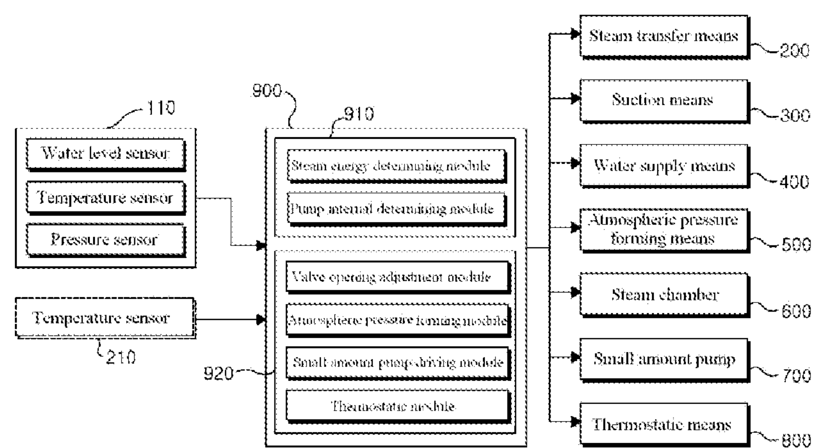
FIG. 6 is a diagram illustrating a major configuration of a control system of an energy saving pump according to a first exemplary embodiment to a fifth exemplary embodiment of the present invention.

FIG. 6 is a diagram illustrating a major configuration of a control system of an energy saving pump according to a first exemplary embodiment to a fifth exemplary embodiment of the present invention. A pump main body detection unit 110 performs a function of detecting an internal state of the pump main body 100 and transferring the internal state to a controller 900 and includes a water level sensor, a temperature sensor, and a pressure sensor.

A temperature sensor 210 is installed in an end terminal of a steam transfer cable to measure a temperature of the steam generator and performs a function of transmitting the measured temperature to the controller 900. As various sensors are already installed in the steam generator according to a design condition, when values thereof may be used, the temperature sensor 210 may not be installed.

The controller 900 is an element for controlling an entire pump operation and may be included in the pump main body 100 and/or may be formed in a terminal form in which remote control is available.

The controller 900 comprehensively determines a state of steam generated in the steam generator and an internal state of the pump main body using a signal of the pump main body detection unit 110 and the temperature sensor 210 and controls driving of the steam transfer means 200, the suction means 300, the water supply means 400, the atmospheric pressure forming means 500, the small amount pump 700, and the thermostatic means 800.

The controller 900 includes a vacuum and water supply determining unit 910 and a driving controller 920, the vacuum and water supply determining unit 910 includes a steam energy determining module and a pump internal determining module, and the driving controller 920 includes a valve opening adjustment module, an atmospheric pressure forming module, a small amount pump driving module, and a thermostatic module.

The steam energy determining module receives a detection value of the temperature sensor 210 and/or a detection value of various sensors already installed in the steam generator and determines a state of steam generated in the steam generator. The pump internal determining module receives a detection value of sensors included in the pump main body detection unit 110 to determine an internal state of the pump main body 100.

The driving controller 920 controls driving of the steam transfer means 200, the suction means 300, the water supply means 400, the atmospheric pressure forming means 500, the small amount pump 700, and the thermostatic means 800 using a value of the steam energy determining module and the pump internal determining module. According to a design condition, a control pattern driven according to steam and an internal state of the pump is recorded in a separate memory and thus the driving controller 920 may be formed to operate using the control pattern.

The valve opening adjustment module is a module that adjusts opening of the steam transfer means 200, the suction means 300, the water supply means 400, and the atmospheric pressure forming means 500. Here, in order to be an application target of the valve opening adjustment module, in the steam transfer means 200, the suction means 300, the water supply means 400, and the atmospheric pressure forming means 500, an electric motion valve may be employed or a means that may perform gradual on/off in addition to instantaneous on/off may be employed.

As an example, as a ball valve type electric motion valve repeatedly drives an opening and closing operation, an opening speed may be adjusted. That is, by adjusting an opening speed of opening and closing means in a pipe between the steam generator, the pump main body 100, the water source, and the use location, a water supply operation to the use location of the pump main body 100 and a suction water supply operation to the inside of the pump main body 100 may be stably performed. A means of a function that can adjust an orifice of a pipe may be employed according to a design condition.

The atmospheric pressure forming module performs a function of controlling driving of the atmospheric pressure forming means 500 by interlocking with the valve opening adjustment module. That is, when a water source is positioned higher than the pump main body 100, after enabling an atmospheric pressure to be formed at the inside of the main body without suction water supply, the suction means 300 may be opened or the atmospheric pressure forming means 500 may be driven according to a condition while performing suction water supply. Further, when it is necessary to adjust a vacuum level of the inside of the pump main body 100 according to a signal of the vacuum and water supply determining unit 910, the atmospheric pressure forming module controls driving of the atmospheric pressure forming means 500.

The small amount pump driving module controls driving of the small amount pump 700, and when a pressure of steam energy generated in the steam generator is not enough, by controlling driving of the small amount pump 700 according to a signal of the vacuum and water supply determining unit 910, the small amount pump driving module supplies water of the pump main body 100 to the use location. Further, even when an internal water level of the steam generator is high or even in an emergency situation, by controlling driving of the small amount pump 700, the small amount pump driving module supplies water of the pump main body 100 to the use location.

When the thermostatic module attempts to enable a periphery of the pump main body 100 to be in a constant temperature according to a signal of the vacuum and water supply determining unit 910, the thermostatic module drives the thermostatic means 800. Further, when the thermostatic means 800 includes the cooling means, in order to promote or adjust a condensation operation of the inside of the pump main body 100, the thermostatic module may drive the thermostatic means 800.

Hereinafter, an operation process of an energy saving pump according to the present invention will be described, and a process of supplying water from the pump main body 100 to the use location will be first described.

The controller 900 determines whether a water level of the pump main body 100 is higher than that of the steam generating tank included in the steam generator, and energy of a steam pressure is determined using a temperature value of steam.

First, if a water level of the pump main body 100 is higher than that of the steam generating tank and if a state of steam energy is higher than a reference value, the controller 900 turns on the steam transfer means 200 connected to a steam transfer cable. Here, a reference value is a preset value according to a capacity and a quantity of water of the pump main body 100 and may be changed according to a design condition.

If the steam transfer means 200 is turned on, steam energy of a high pressure is transferred to the pump main body 100 and the water supply means 400 is controlled to supply water to the use location. This is, because a water level of the pump main body 100 is higher than that of the steam generating tank included in the steam generator, when steam energy of a high pressure is used, water can be supplied without additional energy or with only minimum energy.

Second, if a water level of the pump main body 100 is the same as or lower than that of the steam generating tank and if a state of steam energy is higher than a reference value, the controller 900 turns on the steam transfer means 200 connected to the steam transfer cable. Here, the reference value is a preset value according to a capacity and a quantity of water of the pump main body 100 and is the same as a reference value or is a value different from a reference value when a water level of the pump main body 100 is high, and the reference value may be changed according to a design condition. In this case, the water supply means 400 may be replaced with a small amount pump or a structure in which the water supply means 400 and the small amount pump 700 are connected in parallel may be employed, and when the steam transfer means 200 is turned on, as steam energy of a high pressure is transferred to the pump main body 100, water can be supplied with only minimum energy that drives the water supply means 400. That is, because only energy that can correct a necessary water quantity and steam energy, except for transferred steam energy is necessary, water can be supplied with only a small amount pump.

Third, if a state of steam energy is lower than a reference value, the small amount pump driving module controls driving of the small amount pump 700, and water of the pump main body 100 is smoothly supplied to the use location. In this case, because only energy that can correct a necessary water amount and steam energy, except for transferred steam energy is necessary, water can be supplied with only a small amount pump.

Thereafter, a process in which suction water supply is performed from a water source to the pump main body 100 will be described.

After water supply to a use location is performed, suction water supply may be performed or even if water supply is not performed, suction water supply may be individually performed. Further, when water exists at the pump main body 100 or even when water does not exist at the pump main body 100, suction water supply can be performed. First, after water supply to the use location is performed, steam of a high temperature injected into the pump main body 100 is quickly condensed (liquefied), and in this case, the inside of the pump main body 100 becomes vacuum or a state adjacent to vacuum. That is, after water supply is performed, the inside of the pump main body 100 is not a full level and the steam transfer means 200 is in an off state, and steam of a high temperature already injected into the pump main body 100 is in a condition that can be quickly condensed. If a condensed level of internal steam of the pump main body 100 is in a vacuum state or is in a state similar to vacuum, the controller 900 turns on the suction means 300, and suction water supply is performed from a random water source into the pump main body 100. According to a condition, the controller 900 may cool the main body 100 or partially discharge steam for quick condensation.

Second, by turning on a steam transfer means connected to the steam transfer cable regardless of water supply to the use location, the controller 900 enables steam of a high temperature to be transferred to the inside of the pump main body 100, and when a predetermined condition is formed while detecting an internal state (water level, temperature, pressure) of the pump main body 100, the controller 900 turns off the steam transfer means 200. This is performed under a condition that predetermined space exists at the inside of the pump main body 100 and may be applied to a situation in which water does not exist. After the steam transfer means 200 is turned off, the controller 900 detects a temperature and a pressure of the inside of the pump main body 100 and determines a condensed level of internal steam. If a condensed level of internal steam of the pump main body 100 is a vacuum state or a state similar to vacuum, the controller 900 turns on the suction means 300 connected to a suction cable installed at a water source to automatically suck and supply water from the water source to the pump main body 100.

Third, when the water source is positioned higher than the pump main body 100, by turning on the atmospheric pressure forming means 500, an internal pressure of the main body is formed to an atmospheric pressure, and by turning on the suction means 300, water is supplied from the water source to the main body.

Figure 7:
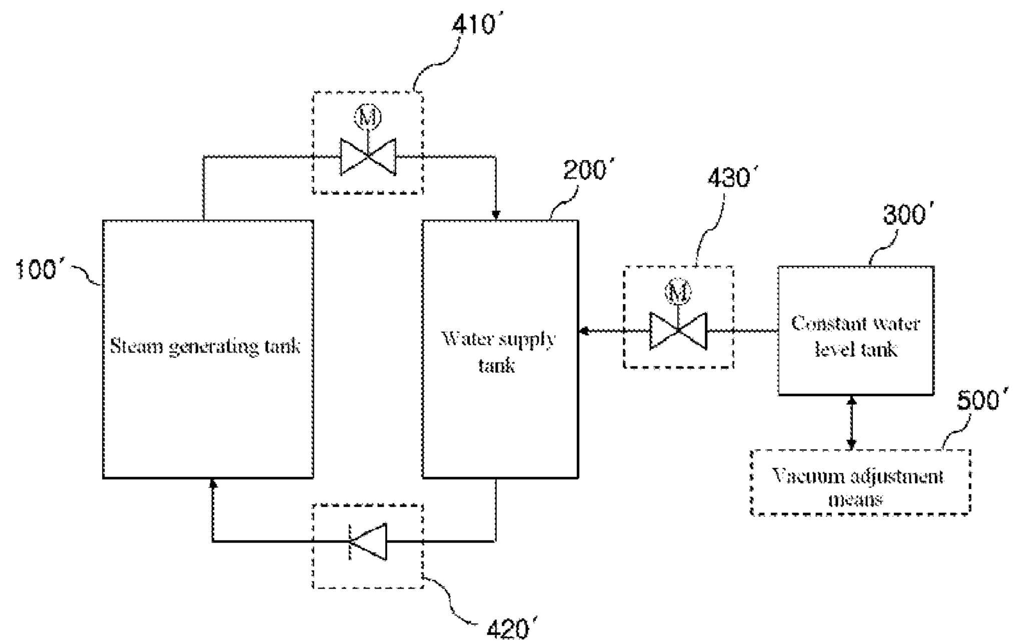
FIG. 7 is a diagram illustrating a major configuration of an energy saving pump employed in a steam generation apparatus according to a sixth exemplary embodiment of the present invention.

FIG. 7 is a diagram illustrating a major configuration of an energy saving pump employed in a steam generation apparatus according to a sixth exemplary embodiment of the present invention. First, a major configuration of an energy saving pump according to the sixth exemplary embodiment includes a water supply tank 200', a constant water level tank 300', a steam transfer means 410', a water supply means 420', and a suction means 430'.

When comparing the pump of the sixth exemplary embodiment with the pump of the first exemplary embodiment to the fifth exemplary embodiment, water supply to the use location becomes water supply to a steam generating tank 100' and suction from the water source becomes suction from the constant water level tank 300'. Therefore, in the foregoing description, in a description described with reference to FIGS. 1 to 6, a description employing the present invention in the steam generation apparatus corresponds to the above described description and therefore a detailed description thereof will be omitted.

First, when installing the steam generating tank 100', the water supply tank 200', and the constant water level tank 300', a mutual height between the steam generating tank 100', the water supply tank 200', and the constant water level tank 300' may be randomly determined. That is, the steam generating tank 100' and the water supply tank 200' may be positioned in an the same level or any one tank may be installed at a position higher than other tanks, and this may be similarly applied in the water supply tank 200' and the constant water level tank 300'. In other words, in the present invention, fluid transfer between the steam generating tank 100' and the water supply tank 200' and fluid transfer between the water supply tank 200' and the constant water level tank 300' are performed to be not limited by a mutual position.

The steam generating tank 100' is a means that generates steam by boiling water using various energy sources such as thermal power generation or nuclear power generation, and the generated steam is designed to be exhausted through a steam discharge means (not shown).

The water supply tank 200' performs a function of receiving a steam pressure of the steam generating tank 100' and supplying water to the steam generating tank 100'.

In order to transfer an internal pressure of the steam generating tank 100' to the water supply tank 200', the steam transfer means 410' is provided in pipes of both tanks, and in order to transfer and supply water of the water supply tank 200' to the steam generating tank 100', the water supply means 420' is provided in another pipe of both tanks. Here, the steam transfer means 410' and the water supply means 420' correspond to the steam transfer means 200 and the water supply means 400 and therefore a detailed description thereof will be omitted.

The constant water level tank 300' performs a function of providing supplementary water to the water supply tank 200' or a function of receiving a steam pressure of the water supply tank 200'. The constant water level tank 300' may be formed to be connected to a water pipe or a condensate water recovery pipe or may be replaced with a separate water source according to a design condition.

In order to transfer a pressure of the water supply tank 200' or transfer water of the constant water level tank 300', the suction means 430' is provided in pipes of both tanks. Here, the suction means 430' corresponds to the suction means 300 and therefore a detailed description thereof will be omitted.

In an process of sucking and supplying water from the constant water level tank 300' to the water supply tank 200', a vacuum adjustment means 500' is provided to adjust an internal state of the water supply tank 200'. That is, when a condensed level of internal steam of the water supply tank 200' is in a state adjacent to vacuum, suction is performed from the constant water level tank 300' to the water supply tank 200' and in consideration of a speed of suction and water supply and an internal state of the water supply tank 200' after suction is complete, the vacuum adjustment means 500' is functioned. As an example, a means having a function that can adjust vacuum by partially providing air may be employed and another means that performs the same function according to a design condition may be employed. Further, the vacuum adjustment means 500' may not be included according to a design condition.

Figure 8:
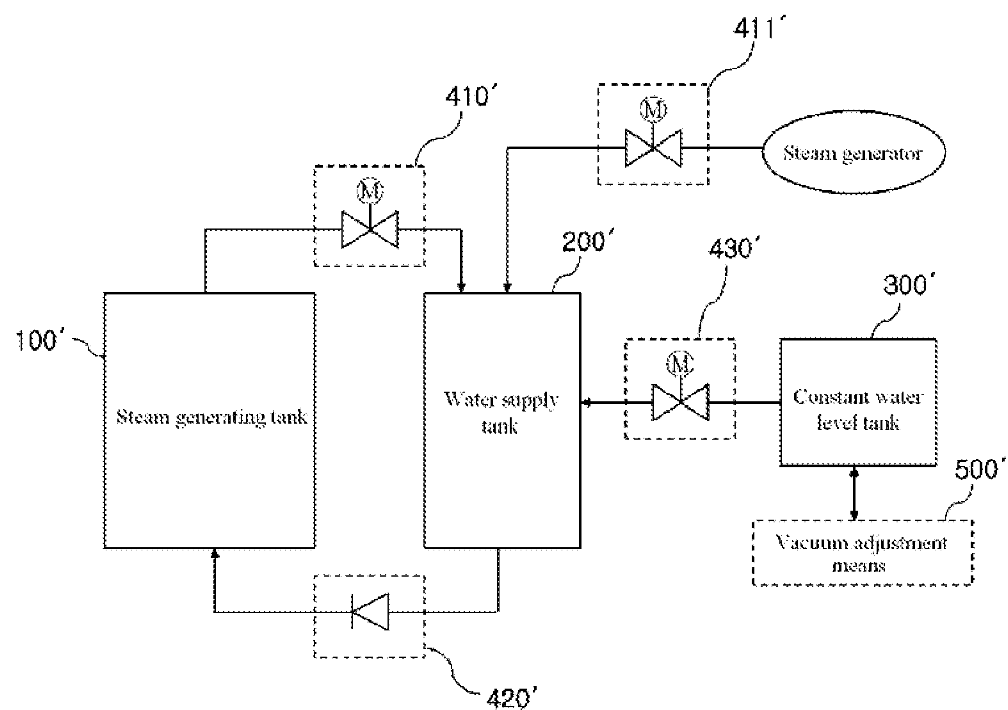
FIG. 8 is a diagram illustrating a major configuration of an energy saving pump employed in a steam generation apparatus according to a seventh exemplary embodiment of the present invention.

FIG. 8 is a diagram illustrating a major configuration of an energy saving pump employed in a steam generation apparatus according to a seventh exemplary embodiment of the present invention. In FIG. 7, the water supply tank 200' additionally includes a pipe connected to an external steam generator, and an external pressure transfer means 411' is employed as a means that opens and closes the pipe.

The external pressure transfer means 411' is a means that performs a function of opening and closing a pipe and may use, for example, an electric motion valve and other means that perform the same function may be employed according to a design condition.

Figure 9:
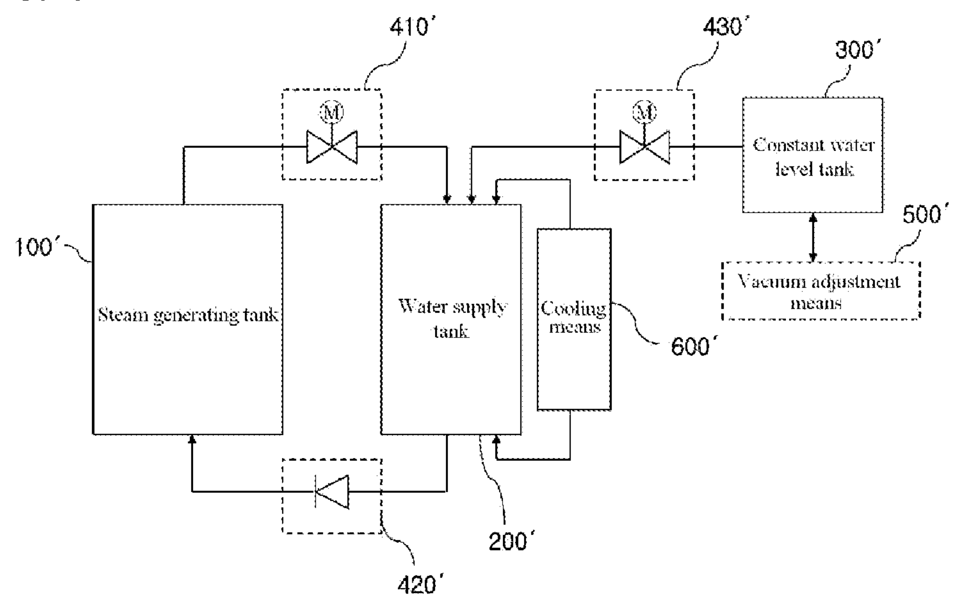
FIG. 9 is a diagram illustrating a major configuration of an energy saving pump employed in a steam generation apparatus according to an eighth exemplary embodiment of the present invention.

FIG. 9 is a diagram illustrating a major configuration of an energy saving pump employed in a steam generation apparatus according to an eighth exemplary embodiment of the present invention. A cooling means 600' is a means that cools the water supply tank 200' and performs a function of quickly condensing internal steam of the water supply tank 200'. The cooling means 600' is described as an example of the thermostatic means 800 of FIG. 5.

Figure 10:
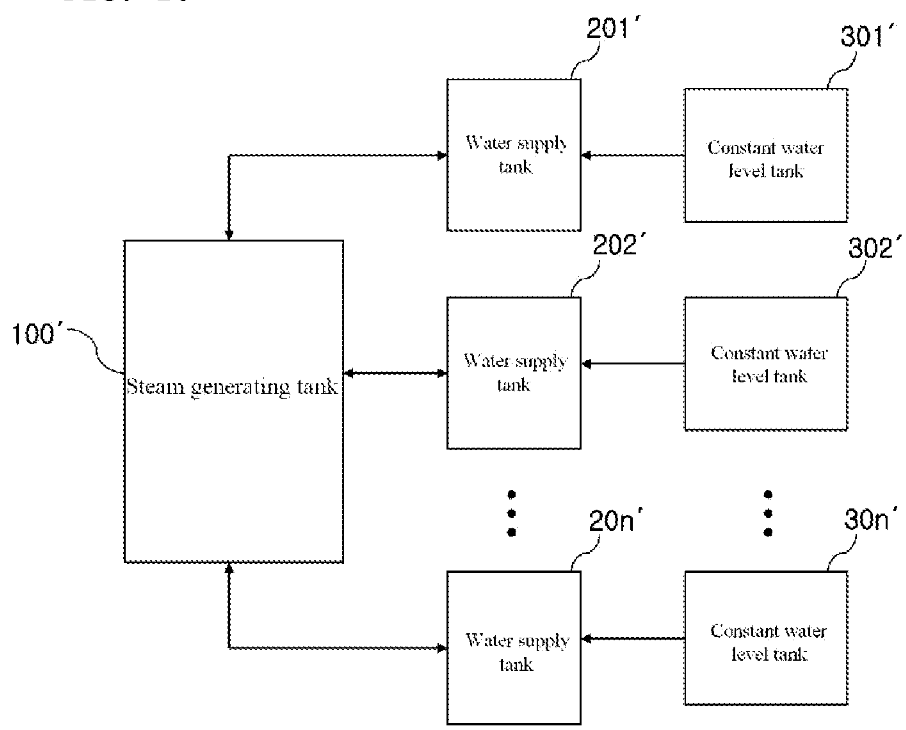
FIG. 10 is a diagram illustrating a major configuration of an energy saving pump employed in a steam generation apparatus according to a ninth exemplary embodiment of the present invention.

FIG. 10 is a diagram illustrating a major configuration of an energy saving pump employed in a steam generation apparatus according to a ninth exemplary embodiment of the present invention. A plurality of water supply tanks **201'-20*n*' may be provided, and a plurality of constant water level tank 301'-30*n*'** may be provided.

A control system of an energy saving pump according to a sixth exemplary embodiment to a ninth exemplary embodiment of the present invention generally includes a major configuration of FIG. 6. However, in order to detect and transmit a water level, a temperature, and/or a pressure of the steam generating tank 100' and the constant water level tank 300' to the controller 900, a sensor may be added to each tank. Each tank may include the entire water level, temperature, and pressure sensors or may selectively include water level, temperature, and pressure sensors according to a design condition. Further, when the vacuum adjustment means 500' is employed, an element that enables the controller 900 to control the vacuum adjustment means 500' may be added. When the external pressure transfer means 411' is employed, an element that enables the controller 900 to control the external pressure transfer means 411' may be added.

When describing a water supply control function from the water supply tank 200' to the steam generating tank 100', as an energy source heats the steam generating tank 100', steam occurs, and when steam is sent to a use location through a steam discharge means, water of the steam generating tank 100' reduces and thus water is supplied from the water supply tank 200' to the steam generating tank 100'.

Preferably, when it is necessary to supply water to the steam generating tank 100' regardless of whether a water level of the water supply tank 200' is higher than or lower than that of the steam generating tank 100', the controller 900 is driven to turn on the water supply means 420'.

First, when a water level of the steam generating tank 100' is detected and transferred to the controller 900, the controller 900 determines whether a present water level is lower than a reference water level. If a present water level is lower than a reference water level, the controller 900 turns on the steam transfer means 410' and transfers a pressure of the steam generating tank 100' to the water supply tank 200', thereby supplying water.

Here, if a water level of the water supply tank 200' is higher than that of the steam generating tank 100', the water supply means 420' is automatically turned on due to a position energy difference and thus water supply is performed from the water supply tank 200' to the steam generating tank 100', and in this case, the water supply means 420' functions as a backward flow preventing check valve.

Second, water may be supplied by turning on the water supply means 420' regardless of a water level of the water supply tank 200', and in this case, the water supply means 420' functions as a micro light weight pump. This is because when turning on the steam transfer means 410', while an internal pressure of the steam generating tank 100' may be transferred to the water supply tank 200', a water supply function of the water supply tank 200' can be smoothly performed.

Third, when a pipe can be formed with an external steam generator, water supply may be performed using the external pressure transfer means 411'. As an example, when a magnitude of a pressure transferred from the steam generating tank 100' to the water supply tank 200' is insufficient to smoothly perform water supply, a pressure of an external steam generator may be additionally used. In this case, the controller 900 controls the external pressure transfer means 411' according to a situation of the steam generating tank 100' and the water supply tank 200'.

When describing pressure, suction, and cooling control functions, if a sensor provided in the steam generating tank senses whether a water level of the steam generating tank arrives at a designated water level and transmits a signal to the controller 900, the controller 900 turns off the steam transfer means 410' to intercept pressure transfer to the water supply tank 200'. Further, the controller 900 receives a signal of a temperature, pressure, and water level of the water supply tank 200' and determines a condensed level of internal steam of the water supply tank 200'. This is to use that steam injected into the water supply tank 200' is quickly condensed (liquefied) because a temperature of the steam generating tank 100' is higher than that of the water supply tank 200'.

In order to promote or adjust to quickly perform a condensation operation (liquefaction) of the inside of the water supply tank 200', the cooling means 600' is additionally included to cool the water supply tank 200'.

When it is detected that a condensed level of steam is similar to vacuum and a water level of the water supply tank 200' is lowered, by turning on the suction means 430', the controller 900 controls to automatically suck and supply water from the constant water level tank 300' to the water supply tank 200'. Here, when the constant water level tank 300' is a water source that can supply water, the constant water level tank 300' may be employed to correspond to the present invention.

Further, a condensed level of steam is not similar to vacuum, but when a water level of the water supply tank 200' is low and when it is necessary to partially discharge a pressure, by turning on the suction means 430', a pressure is transferred to the constant water level tank 300'.

That is, after a pressure is transferred to the constant water level tank 300', the inside of the water supply tank 200' is similar to a vacuum state, and in this case, suction water supply is automatically is performed toward the water supply tank 200'.

Here, in consideration of a speed of suction water supply and a preferable state of the inside of the water supply tank 200' after suction, the vacuum adjustment means 500' that adjusts the inside of the water supply tank 200' may be additionally provided. Preferably, the controller 900 additionally includes a reference database for performing water supply, a pressure, suction, and cooling control according to a capacity and an internal state of the steam generating tank 100', the water supply tank 200', and the constant water level tank 300'.

The invention claimed is:

1. An energy saving pump, comprising:

a pump main body installed to receive steam from a steam generator;

a steam transferor installed in a first pipe connected between the steam generator and the pump main body to open and close the first pipe between the pump main body and the steam generator, such that the steam of a high temperature is transferred from the steam generator to an inside of the pump main body when the steam transferor opens the first pipe;

a water supplier installed in a second pipe between the pump main body and a use location to open and close the second pipe between the pump main body and the use location;

a pump main body detector configured to detect an internal state of the pump main body, wherein the internal state includes a water level, a temperature, and a pressure of the pump main body;

a controller configured to open and close the steam transferor, a suction valve, and the water supplier, wherein water is supplied to the use location by opening the steam transferor and the water supplier, and wherein the controller is configured to turn on or turn off the steam transferor depending on the internal state including the water level detected by a water level sensor, the temperature detected by a temperature sensor and the pressure detected by a pressure sensor of the pump main body detector, and wherein the controller is configured to turn on the suction valve and turn off the stream transferor when a condensed level of internal steam of the pump main body which is detected using the pressure sensor and the temperature sensor of the pump main body detector is in a vacuum state or in a state similar to vacuum even without cooling the pump main body after water supply is performed from the pump main body to the use location, such that suction water supply is performed from the water source into the pump main body in response to the vacuum state or the state similar to vacuum which is generated after the water supply is performed from the pump main body to the use location.

2. The energy saving pump of claim 1, wherein opening speeds of the steam transferor and water supplier are adjusted by repeatedly driving opening and closing operation of the steam transferor and water supplier.

3. The energy saving pump of claim 1, wherein the pump main body is a pressure-resistant container.

4. An energy saving pump, comprising:

a pump main body installed to receive steam in a steam generator;

a steam transferor configured to open and close a pipe between the pump main body and the steam generator, the steam transferor configured to enable the steam of a high temperature to be transferred to an inside of the pump main body;

a small amount pump formed in a pipe between the pump main body and a use location;

a pump main body detector configured to detect an internal state of the pump main body, wherein the internal state includes a water level, a temperature, and a pressure of the pump main body;

a suction valve configured to open and close a pipe between the pump main body and a water source; and a controller configured to open and close the steam transferor and the suction valve, wherein if the steam of the steam generator is smaller than a reference value or if a water level within the steam generator is higher than that within the pump main body, after the steam is received by opening the steam transferor, the small amount pump is driven and water is supplied from the pump main body detector to the use location, wherein the controller is configured to turn on or turn off the steam transferor depending on the internal state including the water level detected by a water lever sensor, the temperature detected by a temperature sensor and the pressure detected by a pressure sensor of the pump main body detector, and wherein the controller is configured to turn on the suction valve and turn off the steam transferor when a condensed level of internal steam of the pump main body which is detected using the pressure sensor and the temperature sensor of the pump main body detector is in a vacuum state or in a state similar to vacuum even without cooling the pump main body after the water supply is performed from the pump main body to the use location, such that suction water supply is performed from the water source into the pump main body in response to the vacuum state or the state similar to vacuum which is generated after the water supply is performed from the pump main body to the use location.

5. The energy saving pump of claim 4, wherein opening speeds of the steam transferor is adjusted by repeatedly driving opening and closing operations of the steam transferor.

6. The energy saving pump of claim 4, wherein the pump main body is a pressure-resistant container.

7. An energy saving pump, comprising:

a pump main body installed to receive steam from a steam generator;

a steam transferor configured to open and close a pipe between the pump main body and the steam generator, the steam transferor configured to enable the steam of a high temperature to be transferred to an inside of the pump main body; and a suction valve configured to open and close a pipe between the pump main body and a water source, a pump main body detector configured to detect an internal state of the pump main body, wherein the internal state includes a water level, a temperature, and a pressure of the pump main body; and a controller configured to open and close the steam transferor and suction valve, wherein the controller is configured to turn on or turn off the steam transferor depending on the internal state including the water level detected by a water level sensor, the temperature detected by a temperature sensor and the pressure detected by a pressure sensor of the pump main body detector, and wherein the controller is configured to turn on the suction valve and turn off the steam transferor when a condensed level of internal steam of the pump main body which is detected using the pressure sensor and the temperature sensor of the pump main body detector is in a vacuum state or is in a state similar to vacuum even without cooling the pump main body after water supply is performed from the pump main body to a use location, such that suction water supply is performed from the water source into the pump main body in response to the vacuum state or the state similar to vacuum which is generated after the water supply is performed from the pump main body to the use location.

8. The energy saving pump of claim 7, wherein opening speeds of the steam transferor and suction valve are adjusted by repeatedly driving opening and closing operations of the steam transferor and suction valve.

9. The energy saving pump of claim 7, wherein the pump main body is a pressure-resistant container.

10. The energy saving pump of claim 7, further comprising an atmospheric pressure former installed in a pipe separately formed in the pump main body, the atmospheric pressure former is configured to open and close the pipe separately formed in the pump main body, wherein by opening and closing the atmospheric pressure former for a reference time, vacuum of an inside of the pump main body is adjusted.

11. The energy saving pump of claim 10, wherein if a position of the water source is higher than that of the pump main body, by opening the atmospheric pressure former and the suction valve, the pump main body sucks water of the water source.

* * * * *